Aug. 16, 1966     J. E. KATON     3,267,115
ORGANIC SEMICONDUCTORS

Filed June 13, 1960     2 Sheets-Sheet 1

*INVENTOR.*
JOHN E. KATON

BY *Lloyd B. Stevens, Jr.*
ATTORNEY

*INVENTOR.*
JOHN E. KATON
BY Lloyd B. Stevens, Jr.
ATTORNEY 3,267,115
ORGANIC SEMICONDUCTORS
John E. Katon, Dayton, Ohio, assignor to Monsanto Company, a corporation of Delaware
Filed June 13, 1960, Ser. No. 35,571
8 Claims. (Cl. 260—314)

The invention relates to new compositions and to semiconductor components made therefrom useful in thermoelectric devices. More particularly the new compositions are reaction products of tetracyanoethylene and a metal salt. The components, articles or bodies made from the new compositions can suitably be in the form of discs, wafers, bars, rods, rectangular parallelepipeds, round or most any geometric shape.

It is well known in the art to employ certain inorganic materials as thermoelectric components, however, few if any suitable organic materials have previously been known. New organic semiconductor materials have now been discovered which are especially desirable because of their low resistivity and their thermoelectric properties. These new compositions are reaction products of tetracyanoethylene and a metal salt. After purification and other treatments, such as heat treatment and/or doping, especially desirable organic semiconductor materials and components are produced. The preferred products for semiconductor use have resistivities of less than $10^5$ ohm-cm. at 25° C.

It is an object of this invention to provide new and useful compositions of matter.

It is another object of this invention to provide new components useful in barrier layer devices.

It is another object of this invention to provide new and useful thermoelectric devices.

It is another object of this invention to provide new and useful thermoelectric devices for generating direct current power.

It is another object of this invention to provide new and useful devices for cooling thermoelectrically.

These and other objects of the invention will become apparent as the detailed description of the invention proceeds.

The reaction products of the invention are formed by reacting tetracyanoethylene with a metal salt. Tetracyanoethylene readily reacts with metal salts, forming reaction products with metals from every group of the periodic table. The structure of these reaction products has not been definitely established since they are apparently quite complex, but it is believed that the structure is similar to the following structure:

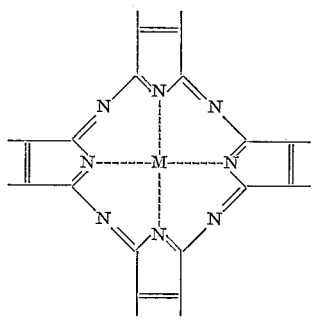

wherein M is a metallic ion. When the reaction products of the invention are made at temperatures of the order of about 300° C. or higher there is a certain amount of fracturing of carbon nitrogen bonds with the resultant loss of nitrogen forming complex materials of unknown structure.

The reaction products of the invention are formed by heating tetracyanoethylene and a metal salt preferably under at least sufficient pressure to maintain the reactants in the liquid phase. It is preferred to carry out the reaction in the presence of a small amount of a hydrogen source, e.g. urea, but this is not necessary. Also it is preferred to carry out the reaction at a temperature in the range of about 100°–300° C. preferably in the range of about 150°–250° C. but the temperature is not critical in that the reaction will proceed at temperatures outside these ranges. Further it is preferred to carry out the reaction in an inert atmosphere such as nitrogen for optimum yield of the desired reaction product. If for example, nitrogen is used as the inert atmosphere, the reaction vessel can be pressured with nitrogen to any desired pressure up to 100,000 pounds or more if desired. Normally it is preferred to use at least about a 3:1 molar ratio of the tetracyanoethylene to the metal salt to form the reaction product; however, a much higher ratio of tetracyanoethylene to the metal salt of the order of 10:1 or higher can be used and maybe desirable; and the ratio of less than 3:1 tetracyanoethylene to metal salt can be used and can under some conditions be desirable to give semiconductor materials with stoichiometric deficiency or excess of the metal salt depending on the ratio of reactants. The time of reaction can vary from an hour or less to a number of days but generally reaction times in the range of about 2 to about 24 hours are sufficient to provide a substantial yield of the desired product.

Suitable metals and salts thereof which can be utilized in the preparation of the polymeric reaction product of the invention are described below. Preferred metals are, for example, zinc, copper, iron, cobalt, nickel, palladium and platinum. Other suitable metals are manganese, chromium, molybdenum, vanadium, beryllium, magnesium, silver, mercury, aluminum, tin, lead, antimony, calcium, barium, cadmium, and other metals. Illustrative suitable metal salts are cuprous chloride, cuprous bromide, cuprous cyanide, cuprous ferricyanide, zinc chloride, zinc bromide, zinc iodide, zinc cyanide, zinc ferrocyanide, zinc acetate, zinc sulfide, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride and the like. The preferred salts are those obtained from the inorganic acids, especially the various metal halides.

Thus the polymeric materials of the invention are for example, zinc - tetracyanoethylene, copper - tetracyanoethylene, iron-tetracyanoethylene, cobalt-tetracyanoethylene, nickel - tetracyanoethylene, palladium - tetracyanoethylene, platinum-tetracyanoethylene, lead - tetracyanoethylene, magesium-tetracyanoethylene reaction products, and the like.

The new polymeric materials do not sublime and there is no known solvent for these materials. In view of the inert character of these materials no known method is available to determine their molecular weight but it is clear from their properties that they are a unique class of material.

For the preparation of the reaction products of the invention it is preferred to use a small amount of a hydrogen source, for example, urea, acetamide, triethanol amine, methyl glutamine, phenols, naphthols, aliphatic hydroxy compounds, and the like.

The reaction products can be purified to remove excess unreacted metal salts by extraction with pyridine, quinoline, picolines, lutidines, etc., and other amines.

Volatile material can be removed from the reaction products of the invention by sublimation treatment under high vacuum at temperatures of about 200–300° C. and at pressures of the order of about 0.5 mm. of Hg absolute pressure or less. Another method of removing excess metal from the reaction products of the invention is by electrolysis method described in copending application Serial No. 12,916, filed March 7, 1960, now abandoned.

Pellets can be formed from the products of the invention with or without the use of binders using a sufficient pressure to fuse the powdered material into a pellet of the desired strength. It is preferred to form the pellet by hot pressing to give pellets of optimum strength and temperatures during hot pressing can suitably be of the order of about 200°–400° C. preferably about 250°–350° C.

The degree and/or the type of conductivity and the thermoelectric properties of the reaction products of the invention can be modified by heat treating the material in either powdered or pelleted form under high vacuum or in the presence of an inert atmosphere at temperatures in the range of about 180°–700° C., preferably 300°–600° C. The time of heating varies with the temperature and the properties of the product desired and may vary from an hour or less to a number of days. During the heat treatment the products are pyrolyzed with the fracturing of carbon-nitrogen bonds and the loss of nitrogen from the composition.

The invention will be more clearly understood from the following detailed description of the specific examples thereof read in conjunction with the accompanying drawings wherein.

*Example 1*

Figure 1:
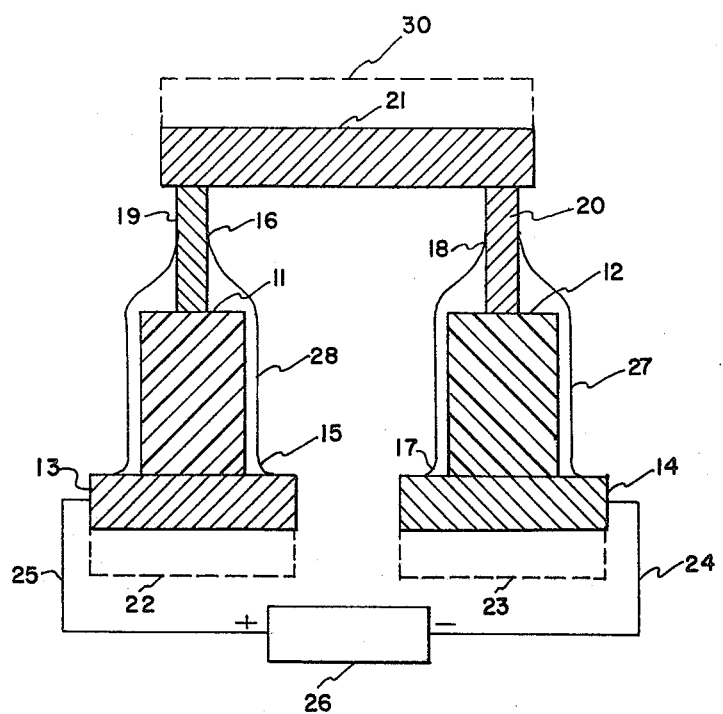
FIGURE 1 is an elevational view partially in section of one embodiment of the invention.

This example describes the making of a reaction product of tetracyanoethylene and cuprous chloride. Samples of 12.8 grams of tetracyanoethylene, 5.0 grams of cuprous chloride and 1.0 gram of urea were charged to a 300 ml. glass-lined bomb under 1000 p.s.i.g. of nitrogen and heated to 250° C. The reactants were kept at this temperature for two hours, then temperature was raised to 300° C. and kept at this higher temperature for 18 hours. The resulting black solid product was extracted with pyridine in a "Soxhlet" extractor until the extracts were no longer colored. The solid was removed from the Soxhlet extractor, ground using a mortar and pestle and reextracted with pyridine until the extracts were no longer colored. This extracted powdered material was removed from the "Soxhlet" extractor and oven dried with 10.4 grams of black powder being recovered as the dried product. This black powdered product failed to melt below 300° C. An elemental analysis of this powder yielded the following results:

| Percent: | Found |
| --- | --- |
| C | 52.1 |
| H | 3.1 |
| N | 22.3 |
| Cl | 3.4 |
| Cu | 14.7 |

A sample of the powdered product of Example 1 was tested for electrical properties as follows: The test cell for the electrical measurement is a hollow quartz cylinder placed upright on a platinum plate which seals the bottom opening of the cylinder. The internal diameter of the quartz cylinder is ¾". The powdered sample to be tested is added to the quartz cylinder to a depth of 1–2 millimeters. A platinum slug is inserted to the top of the quartz cylinder and a pressure of 900 g./sq. cm. is applied through this platinum slug to the powdered sample. The sample is heated by conduction through the platinum plate to a temperature of about 280° C. under a vacuum of about $10^{-3}$ mm. of Hg at least overnight. The next day the sample is subjected to a series of treatments involving evacuation under high vacuum, purging with nitrogen, evacuation under high vacuum and finally to a nitrogen atmosphere of 5" of Hg absolute pressure for the electrical testing. During the electrical testing the pressure of 900 g./sq. cm. is maintained on the powdered sample as described above. As indicated above, the heating of the samples is accomplished by conduction through the platinum plate upon which the quartz cylinder rests. The resistivity of this sample measured at 59° C. was 19 ohm-cm. and at 276° C. was 15 ohm-cm.

A pellet of about 1 mm. thick and ½" in diameter was formed in a dye by cold pressing using a force of about 20,000 pounds. This pellet was somewhat fragile so a second pellet was pressed at 300° C. and 14,000 p.s.i.g. giving an improved pellet of greater strength. The thermoelectric testing of this second hot pressed pellet was carried out in the following fashion: The pellet to be tested was placed on a gold plated copper plate which served as a cold (about 23° C.) electrode of the thermoelectric generator. The hot electrode for the generator was a soldering iron having a gold plated tip which was mounted in a jig and could be raised or lowered by a screw arrangement. Three measurements were taken at different points on the sample and averaged for the thermoelectric power reported. During the measurements the soldering iron was pressed against the upper surface of the sample with sufficient pressure being applied to give good ohmic contact both for the soldering iron and the copper plate with the sample. The series electrical circuit was completed from the gold-plated copper plate through a galvanometer, the soldering iron, the sample and back to the copper plate. In the test the hot probe was heated to approximately 100° above the temperature of the cold plate before being applied to the pellet being tested. The actual hot probe and cold plate temperatures were measured by thermocouple. For each reading the apparatus was allowed to come to equilibrium and the highest voltage generated was noted. Although the pyrolyzed pellets have very good thermoinsulating powers, if the hot probe is maintained in contact with the sample over a long period of time the cold copper plate tends to approach the temperature of the hot probe due to heat of conduction through the sample. This is the reason for taking the highest voltage noted on the galvanometer as the reading, because this is in fact indicative of the thermoelectric properties of the sample. From this test it was determined that the thermoelectric power (TEP) was about −9 microvolts/° C. The negative sign indicates that the sample has N-type conductivity.

*Example 2*

This example describes another reaction product preparation of tetracyanoethylene and cuprous chloride. Samples of 12.8 grams of tetracyanoethylene, 5.0 grams of cuprous chloride and 1.0 gram of urea were charged to a 300 ml. glass-lined bomb, pressured to 750–1000 p.s.i.g. with nitrogen and maintained at 200° C. for 18 hours. The black powdered product recovered from the bomb was ground and extracted in a "Soxhlet" extractor with pyridine until the extracts were colorless. The extracted material was then subjected to sublimation treatment at 250° C. under high vacuum of the order of about 0.1 mm. of Hg overnight to sublime out any low molecular weight material. The resistivity of this product of Example 2 determined in the same manner as the product of Example 1 was 2.7 times $10^4$ ohm-cm. at 68° C. and $1.5 \times 10^3$ ohm-cm. at 360° C.

The elemental analysis of the product of Example 2 was as follows:

| Percent | Found | Calc'd for $C^{12}N^8Cu$ |
| --- | --- | --- |
| C | 43.3 | 45.0 |
| H | 0.0 | 0.0 |
| N | 32.0 | 35.0 |
| Cu | 17.4 | 20.0 |

It appears that the product of Example 2 much more closely approximates the theoretically proposed structure than does the product of Example 1. This can possibly be explained on the basis that the product of Example 1 was subjected to higher temperatures and more carbonization and loss of nitrogen probably resulted.

FIGURE 1 broadly embodies a thermoelectric device which can be either a thermoelectric generator or a thermoelectric cooling device depending on the designation of certain of the components. For the thermoelectric generating device a body 11 in the form of an N-type wafer or disc of tetracyanoethylene/cuprous chloride reaction product is used, and body 12 is a P-type wafer of tetracyanoethylene/cuprous chloride reaction product or alternatively a P-type wafer of pyrolyzed pyromellitonitrile/methanol reaction product described in detail in copending application Serial No. 11,897, filed February 29, 1960. Electrodes leading from the tops of the discs 11 and 12 are numbered 19 and 20, and these electrodes can be copper, aluminum or other suitable conductors. Ohmic contact can be made between discs 11 and 12 and electrodes 19 and 20, respectively, by coating the upper surface of the discs with silver or other noble metal and soldering the electrodes thereto, with, e.g. a lead-tin eutectic alloy having some cadmium therein. The coating of silver, for example, can be applied to the top of the discs by evaporation of the silver on to the disc tops or alternatively with silver paint, which is commercially available. The other ends of the electrodes, 19 and 20 are then connected by soldering or other suitable mechanical means to cold junction body 21, which is a copper or aluminum rectangular plate. The hot junctions of the device consist of copper or aluminum bodies 13 and 14, which are suitably in the form of rectangular plates and are electrically connected to discs 11 and 12 in a similar manner as were electrodes 19 and 20.

Discs 11 and 12 can be enclosed in glass shells 27 and 28, which are sealed to the hot junction bodies 13 and 14 which are rectangular copper or aluminum plates by metal to glass seals 15 and 17. These metal seals for use in sealing metal to glass, i.e. making metal to glass junction seals, are well known and commercially available. Similar metal seals 16 and 18 are used to seal the glass envelope to electrodes 19 and 20. Glass seals such as have been proposed can be used where it is desirable to encapsulate the discs for one reason or another. Thus the discs 11 and 12 or one of them can be surrounded by any desired atmosphere, inert or otherwise, or by high vacuum, if desired.

If the device of FIGURE 1 is to be a thermoelectric generating device, elements 22 and 23 are some sort of heating source, such as a heating jacket, gas burners, etc. It is desirable although not mandatory that the cold junction 21 have the heat removed therefrom by a cooling jacket 30, which is attached to plate 21. Cooling fluid, for example, water is circulated through jacket 30 to remove the heat transmitted by the hot junctions to plate 21. Suitably also, plate 21 is cooled by forced drafts or air as by a fan blowing over the surface of plate 21. With such an arrangement as this, i.e., heated plates 13 and 14 and cooled plate 21, a thermoelectric current will be generated in discs 11 and 12, and if 26 is a load such as a radio receiver, a storage battery to be charged, a microswitch or other type of switch to be operated, or other electrical device, power will be provided to operate the electrical device. The positive and negative terminals of the device are indicated in FIGURE 1 at opposite ends of load 26. Voltage generated can be increased by connecting a number of such N-type and P-type bodies in series. For increased current flow, a number of the bodies are connected in parallel.

If instead of a load 26, a battery 26 or other direct current source of electricity is connected with positive and negative terminals as indicated in FIGURE 1, a thermoelectric cooling system results. In this system the cold junction will be plate 21 and the hot junction plates 13 and 14. In a refrigerating apparatus, for example, or for that matter in other cooling devices, it is desirable for maximum heat removal from the hot junctions to add cooling fins to plates 13 and 14. Also, suitably heat transfer fins are added to plate 21 to absorb heat and transmit it to plate 21. For use in refrigeration cold junction 21 would, of course, be positioned within the compartment or area to be cooled, whereas the hot junctions would be positioned outside of the area being cooled. A number of the devices of FIGURE 1 could be electrically connected in parallel or in series as would be most appropriate to increase the cooling surface and capacity.

Figure 2:
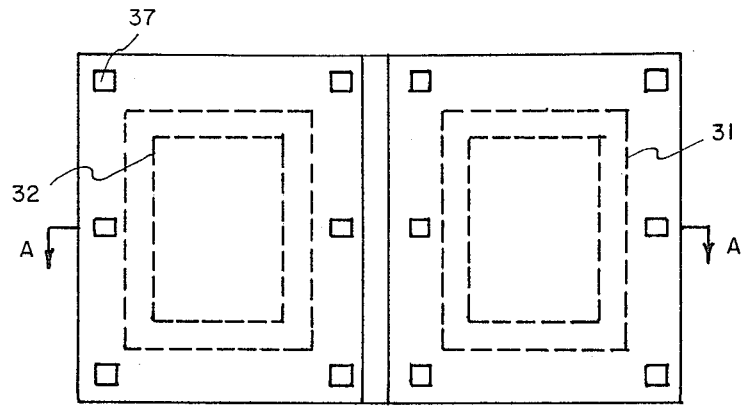
FIGURE 2 is a bottom view of another embodiment of the invention.
Figure 3:
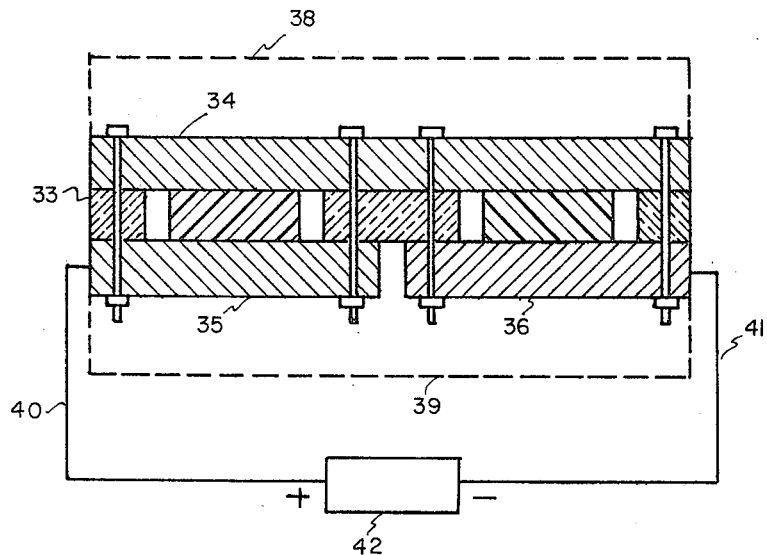
FIGURE 3 is an elevational view partially in section of the same embodiments as FIGURE 2.

FIGURES 2 and 3 show another embodiment of the invention. Bodies 31 and 32 suitably in the form of rectangular plates are P-type and N-type tetracyanoethylene/cuprous chloride reaction product, respectively; however, alternatively, either of bodies 31 or 32 can be pyrolyzed pyromellitonitrile/methanol reaction products described in detail in copending application Serial No. 11,897, filed February 29, 1960, now U.S. Patent No. 3,157,687. Body 34 suitably a copper or aluminum rectangular plate serves as the cold junction for the device, being bonded to plates 31 and 32 in a similar manner to that described in FIGURE 1. The hot junction bodies 35 and 36 suitably copper or aluminum plates are in a like fashion electrically connected to discs 31 and 32 to form ohmic junctions therewith. Gasket 33 is normally preferably made of an inorganic material such as glass, mica, or other materials which will withstand high temperatures, if the thermoelectric device is to be subjected to high temperature. If the device is not to be subjected to high temperatures, rubber or other similar gaskets can be used. Gasket 33 serves as an insulating separator between plates 34 and 35 and 36, and also serves to enclose on the sides thermoelectric discs 31 and 32. Thus with the metal plates 34, 35 and 36, and the gasket 33, plates 31 and 32 are encapsulated in separate compartments surrounded on the sides by vapor spaces. To prevent electrical short-circuiting of the device bolts and nuts 37 must be insulated from metal plates 34, 35 and 36 by electrical insulating washers and sleeves made of conventional materials such as rubber or inorganic materials described above, if the device is to be used at high temperatures.

As in FIGURE 1, if the device is a thermoelectric generator, it is necessary to have a heating means 39 which can be the same as described in FIGURE 1 for heating hot junctions which are plates 35 and 36, and it is desirable for maximum efficiency although not mandatory that cold junction plate 34 be cooled by conventional means 38 such as are described with respect to FIGURE 1. Leads 40 and 41 connect electrically hot junction plates 35 and 36 with a load 42, which can suitably be the same type of load as employed in the thermoelectric generator of FIGURE 1.

If the device of FIGURES 2 and 3 is used as a thermoelectric cooling device, it is desirable to attach fins to hot junctions 35 and 36. It is also desirable to employ a blower or other cooling device 39 for the purpose of aiding the removal of heat from the hot junctions. Likewise it is desirable to employ cooling fins attached to cold junction 34 for gathering heat from the enclosure which is being cooled and conducting it to the cold junction. A D.C. voltage source 42 such as a battery is connected in the circuit as indicated by the plus and minus terminals on FIGURE 3 to serve as the source of power to operate the cooling device.

As in the case of the device of FIGURE 1 whether used for electrical power generation or cooling, a number of the devices of FIGURES 2 and 3 can suitably be electrically connected in parallel or series.

If the thermoelectric discs are not enclosed in housings such as in FIGURE 1 and FIGURES 2 and 3, it will be desirable in some cases to encapsulate the discs except at the electrode connections, for example, by covering the discs with a protective film of silicone varnish, glass, plastic resin, etc.

In the devices of FIGURES 1–3, either the N-type bodies or the P-type body of tetracyanoethylene/cuprous chloride reaction product can be replaced by another N-type or P-type body, e.g. N-type bismuth telluride or P-type bismuth telluride could be used. Other N-type or P-type thermoelectric bodies either organic or inorganic can be used in conjunction with a P-type or an N-type body of tetracyanoethylene/cuprous chloride reaction product.

In addition to being useful in thermoelectric devices, the reaction product of the invention also have the following uses: Devices for amplification of current, rectification of current-point contact rectifier, temperature regulation-thermistor, solar cells, photoelectric cells, in panel lighting circuits, coatings for cathode ray tubes, in printed circuits, as anti-static agents, resistors, photocapacitors, photo-resistors, and the like.

Although the invention has been described in terms of specified apparatus which is set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A polymeric reaction product of substantially two moles of tetracyanoethylene per mole of metal salt, said reaction product formed by heating the reactants in an inert atmosphere at a temperature sufficient to cause reaction but insufficient to cause substantial pyrolysis of the reaction product in the range of about 100°–300° C.

2. A reaction product of claim 1 wherein said metal salt is cuprous chloride.

3. A pyrolyzed reaction product of claim 1 wherein said reaction product is heated at a temperature sufficient to cause loss of nitrogen in the range of about 180°–700° C. and for a sufficient time to change the conductivity and thermoelectric properties of the product.

4. A pyrolyzed reaction product of claim 3 wherein said metal salt is cuprous chloride.

5. A process comprising heating tetracyanoethylene with a metal salt in an inert atmosphere at a temperature sufficient to cause reaction but insufficient to cause substantial pyrolysis of the reaction product in the range of about 100°–300° C.

6. A process of claim 5 wherein said metal salt is cuprous chloride.

7. A process comprising heating a reaction product of claim 5 at a temperature sufficient to cause loss of nitrogen in the range of about 180°–700° C. and for a sufficient time to change the conductivity and thermoelectric properties.

8. The process of claim 7 wherein said metal salt is cuprous chloride.

References Cited by the Examiner

UNITED STATES PATENTS

| | | | |
|---|---|---|---|
| 2,681,345 | 6/1954 | France et al. | 260—314 |
| 2,765,308 | 10/1956 | Campbell | 260—314 |
| 2,794,823 | 6/1957 | Heckert | 260—468.5 |
| 2,841,574 | 7/1958 | Foster | 260—88.7 |
| 2,911,425 | 11/1959 | Scalera et al. | 260—438 |
| 2,928,856 | 3/1960 | Harwood et al. | 260—438 |
| 2,953,616 | 9/1960 | Pessel et al. | 136—5 |
| 2,957,937 | 10/1960 | Jensen et al. | 136—5 |

FOREIGN PATENTS

| | | |
|---|---|---|
| 757,773 | 9/1956 | Great Britain. |
| 126,612 | 3/1960 | Russia. |

OTHER REFERENCES

Berlin et al.: II, Izvest. Akad. Nauk., S.S.S.R. Otdel, Khim. Nauk., Nov. 1, 1959, page 2261.

Lubs, Chemistry of Synthetic Dyes and Pigments, Reinhold Pub. Corp., New York (1955), pages 580, 581 and 584–587.

WALTER A. MODANCE, *Primary Examiner.*

JOHN H. MACK, IRVING MARCUS,
        NICHOLAS S. RIZZO, *Examiners.*

J. BARNEY, JAMES A. PATTEN, *Assistant Examiners.*